(12) United States Patent
Ritter et al.

(10) Patent No.: US 9,069,805 B2
(45) Date of Patent: Jun. 30, 2015

(54) MIGRATION OF BUSINESS OBJECT DATA IN PARALLEL WITH PRODUCTIVE BUSINESS APPLICATION USAGE

(71) Applicants: Gerd M. Ritter, Heidelberg (DE); Carsten Thiel, Heidelberg (DE)

(72) Inventors: Gerd M. Ritter, Heidelberg (DE); Carsten Thiel, Heidelberg (DE)

(73) Assignee: SAP SE, Walldorf (DE)

( * ) Notice: Subject to any disclaimer, the term of this patent is extended or adjusted under 35 U.S.C. 154(b) by 23 days.

(21) Appl. No.: 13/679,561

(22) Filed: Nov. 16, 2012

(65) Prior Publication Data

US 2014/0143263 A1  May 22, 2014

(51) Int. Cl.
*G06F 17/30* (2006.01)

(52) U.S. Cl.
CPC ................................ *G06F 17/30303* (2013.01)

(58) Field of Classification Search
CPC .................. G06F 17/30575; G06F 17/30578; G06F 2201/80; G06F 17/30289
See application file for complete search history.

(56) References Cited

U.S. PATENT DOCUMENTS

| | | | |
|---|---|---|---|
| 6,324,654 B1 | 11/2001 | Wahl et al. | |
| 6,377,959 B1 | 4/2002 | Carlson | |
| 7,228,132 B2 | 6/2007 | Gopalakrishnan et al. | |
| 7,565,376 B2 | 7/2009 | Stegmann et al. | |
| 7,624,340 B2 | 11/2009 | Ritter | |
| 7,630,969 B2 | 12/2009 | Ritter | |
| 7,650,609 B2 | 1/2010 | Klevenz et al. | |
| 7,680,783 B2 | 3/2010 | Ritter et al. | |
| 7,689,904 B2 | 3/2010 | Ritter | |
| 7,877,422 B2 * | 1/2011 | Kothandaraman | 707/809 |
| 7,885,847 B2 | 2/2011 | Wodtke et al. | |
| 7,966,566 B2 | 6/2011 | Ritter et al. | |
| 7,979,296 B2 | 7/2011 | Kruse et al. | |
| 8,001,079 B2 | 8/2011 | Lu et al. | |
| 8,046,389 B2 | 10/2011 | Ritter | |
| 8,099,661 B2 | 1/2012 | Ritter | |
| 8,108,433 B2 | 1/2012 | Baeuerle et al. | |
| 8,140,644 B2 | 3/2012 | Hagale et al. | |
| 8,200,634 B2 | 6/2012 | Driesen et al. | |
| 8,212,683 B2 | 7/2012 | Klein et al. | |
| 8,225,303 B2 | 7/2012 | Wagner et al. | |
| 8,291,038 B2 | 10/2012 | Driesen | |

(Continued)

OTHER PUBLICATIONS

U.S. Appl. No. 12/336,897, filed Dec. 17, 2008, Volker Driesen.

(Continued)

*Primary Examiner* — Angelica Ruiz
(74) *Attorney, Agent, or Firm* — Fish & Richardson P.C.

(57) ABSTRACT

The disclosure generally describes computer-implemented methods, computer-program products, and systems for modeling and deploying decision services. One computer-implemented method includes during uptime processing: generating at least one shadow database table corresponding to a new business object (BO) persistency model, establishing change recording for at least one database table associated with an old BO persistency model, retrieving, as changed data and using at least one computer, changed BO data from the at least one database table, transforming, as transformed data, the changed data to correspond to the new BO persistency model, writing the transformed data to the generated at least one shadow database table, and retrieving, as further changed data, BO data from the at least one database table upon a determination that the BO data has changed in the at least one database table after a prior retrieval of the BO data from the at least one database table.

18 Claims, 5 Drawing Sheets

(56) References Cited

U.S. PATENT DOCUMENTS

| | | |
|---|---|---|
| 8,356,010 B2 | 1/2013 | Driesen |
| 8,392,573 B2 | 3/2013 | Lehr et al. |
| 8,402,086 B2 | 3/2013 | Driesen et al. |
| 8,412,739 B2 | 4/2013 | Engelko et al. |
| 8,434,060 B2 | 4/2013 | Driesen et al. |
| 8,479,187 B2 | 7/2013 | Driesen et al. |
| 8,589,909 B2 | 11/2013 | Hu et al. |
| 2003/0130985 A1 | 7/2003 | Driesen et al. |
| 2005/0027585 A1 | 2/2005 | Wodtke et al. |
| 2005/0033626 A1 | 2/2005 | Kruse et al. |
| 2005/0257216 A1 | 11/2005 | Cornell et al. |
| 2006/0080338 A1 | 4/2006 | Seubert et al. |
| 2006/0085336 A1 | 4/2006 | Seubert et al. |
| 2006/0085450 A1 | 4/2006 | Seubert et al. |
| 2006/0282697 A1 | 12/2006 | Sim-Tang |
| 2007/0209015 A1 | 9/2007 | Ritter |
| 2008/0098046 A1 | 4/2008 | Alpern et al. |
| 2008/0115134 A1 | 5/2008 | Elliott et al. |
| 2008/0120129 A1 | 5/2008 | Seubert et al. |
| 2008/0255865 A1 | 10/2008 | Ritter et al. |
| 2009/0006443 A1* | 1/2009 | Kothandaraman ............ 707/102 |
| 2009/0112908 A1* | 4/2009 | Wintel et al. ................. 707/102 |
| 2010/0088281 A1* | 4/2010 | Driesen et al. ............... 707/641 |
| 2010/0138440 A1* | 6/2010 | Driesen ......................... 707/765 |
| 2010/0153341 A1 | 6/2010 | Driesen et al. |
| 2010/0332585 A1 | 12/2010 | Driesen |
| 2012/0005670 A1 | 1/2012 | Driesen et al. |
| 2012/0011190 A1 | 1/2012 | Driesen et al. |
| 2012/0011389 A1 | 1/2012 | Driesen et al. |
| 2012/0023125 A1 | 1/2012 | Driesen et al. |
| 2012/0030184 A1 | 2/2012 | Driesen et al. |
| 2012/0036165 A1 | 2/2012 | Driesen et al. |
| 2012/0041933 A1 | 2/2012 | Driesen |
| 2012/0041988 A1 | 2/2012 | Driesen |
| 2012/0047185 A1 | 2/2012 | Driesen et al. |
| 2012/0159421 A1 | 6/2012 | Driesen |
| 2012/0166459 A1 | 6/2012 | Ritter et al. |
| 2012/0239616 A1 | 9/2012 | Cunningham et al. |
| 2012/0260242 A1 | 10/2012 | Nguyen et al. |
| 2012/0303665 A1 | 11/2012 | Engelko et al. |
| 2012/0304165 A1 | 11/2012 | Bechtel et al. |
| 2012/0317168 A1 | 12/2012 | Driesen et al. |
| 2013/0055232 A1 | 2/2013 | Rajan et al. |
| 2013/0080339 A1 | 3/2013 | Driesen et al. |
| 2013/0080617 A1 | 3/2013 | Driesen et al. |
| 2013/0159247 A1 | 6/2013 | Engelko et al. |
| 2013/0290259 A1 | 10/2013 | Hoprich et la. |

OTHER PUBLICATIONS

U.S. Appl. No. 12/844,662, filed Jul. 27, 2010, Volker Driesen.
U.S. Appl. No. 12/980,170, filed Dec. 28, 2010, Gerd M. Ritter, et al.
U.S. Appl. No. 13/336,782, filed Dec. 23, 2011, Gerd M. Ritter, et al.
U.S. Appl. No. 13/535,418, filed Jun. 28, 2012, Bettin, et al.
U.S. Appl. No. 13/730,746, filed Dec. 28, 2012, Driesen, et al.
U.S. Appl. No. 13/730,753, filed Dec. 28, 2012, Driesen, et al.
U.S. Appl. No. 13/730,756, filed Dec. 28, 2012, Driesen, et al.

* cited by examiner

MIGRATION OF BUSINESS OBJECT DATA IN PARALLEL WITH PRODUCTIVE BUSINESS APPLICATION USAGE

BACKGROUND

The present disclosure relates to computer-implemented methods, computer-program products, and systems for migration of business object (BO) data. Upgrading an enterprise resource planning (ERP) system to a new software release often requires migration of existing persistent BO data associated with a database on the ERP system. The need for migrating persistent BO data is common for new software releases often due to changes in a persistency model associated with a BO instance, for example, changed field value semantics requiring re-assignment of field values and/or new fields or values added to the BO persistency model that must be initialized according to application specific logic. Changes in the BO persistency model are often due to the need to fulfill new or changed customer requirements, system architectural changes, and/or to react to technology changes. Other reasons to migrate persistent BO data include refactoring of the BO persistency model and/or changes to a BO and/or business process model.

Migrations of BO data are typically performed during a software upgrade downtime period where the ERP system is taken offline while the migration of BO data is taking place. Depending on the amount of BO data to migrate, a migration of the BO data normally requires a considerable amount of time and results in excessive downtime for the ERP system. Excessive downtime impacts an organizations' ability to provide functional business applications and/or necessary data for use by customers. As a result, customers often forego ERP software upgrades and/or establish strict service level agreement (SLA) requirements between the organization and an operational information technology (IT) organization. The SLA normally mandates a maximum permitted downtime for the IT organization to perform BO data migrations in order to minimize the impact of BO data migrations on ERP systems' business application and/or data usage.

Performing migrations of BO data prior to or after the software upgrade downtime period also introduces technical challenges. Migrating the BO data after the software upgrade may restrict users to the use of up-to-date/migrated data that may be limited until the migration is complete. Migrating the BO data prior to the software upgrade may result in possible conflicts if users change BO data to be migrated and often necessitates data locking or multiple re-migrations of data.

SUMMARY

The present disclosure relates to computer-implemented methods, computer-program products, and systems for migration of business object (BO) data. One computer-implemented method includes during uptime processing: generating at least one shadow database table corresponding to a new business object (BO) persistency model, establishing change recording for at least one database table associated with an old BO persistency model, retrieving, as changed data and using at least one computer, changed BO data from the at least one database table, transforming, as transformed data, the changed data to correspond to the new BO persistency model, writing the transformed data to the generated at least one shadow database table, and retrieving, as further changed data, BO data from the at least one database table upon a determination that the BO data has changed in the at least one database table after a prior retrieval of the BO data from the at least one database table.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by a data processing apparatus, cause the apparatus to perform the actions.

The foregoing and other implementations can each optionally include one or more of the following features:

A first aspect, combinable with the general implementation, wherein a BO meta-model describes BO dependencies and BO relationships to the at least one database table and wherein each BO has a dedicated root database table containing header entries of all instances of the BO and database tables containing BO data associated with the BO that are dependent on the dedicated root database table.

A second aspect, combinable with any of the previous aspects, wherein change recording logs changes to both the dedicated root database table and the dependent database tables.

A third aspect, combinable with any of the previous aspects, wherein retrieving the changed data from the at least one database table includes: deriving BO instance identifiers from database records read from the dedicated root database table; and reading data from each BO instance associated with the derived BO instance identifiers from the dedicated root database table for the BO instance and dependent database tables containing BO data associated with the BO instance.

A fourth aspect, combinable with any of the previous aspects, wherein a particular BO instance is determined following a change to a row in a dependent database table following a change to the particular BO instance's data where a BO header entry for the particular BO instance in the dedicated root database table remains unchanged.

A fifth aspect, combinable with any of the previous aspects, further comprising confirming the transformed data is correctly written to the at least one shadow database table.

A sixth aspect, combinable with any of the previous aspects, further comprising: based upon a determination that a downtime processing is appropriate: retrieving, as final changed data, BO data from the at least one database table that has changed in the at least one database table after a final non-downtime retrieval of the BO data from the at least one database table; transforming, as final transformed data, the final changed data to correspond to the new BO persistency model; and writing the final transformed data to the generated at least one shadow database table.

The subject matter described in this specification can be implemented in particular implementations so as to realize one or more of the following advantages. First, business downtime is minimized for BO data migrations. Second, the minimization of business downtime permits organizations to perform large, previously infeasible data migrations. Third, a minimum of BO specific implementation effort is required which permits minimization of implementation costs, reuse, centralized software bug fixing, and a higher coverage of code and minimizes risk for both the customer and an IT organization performing the BO data migration.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

This disclosure generally describes computer-implemented methods, computer-program products, and systems for migration of business object data.

Figure 1A:
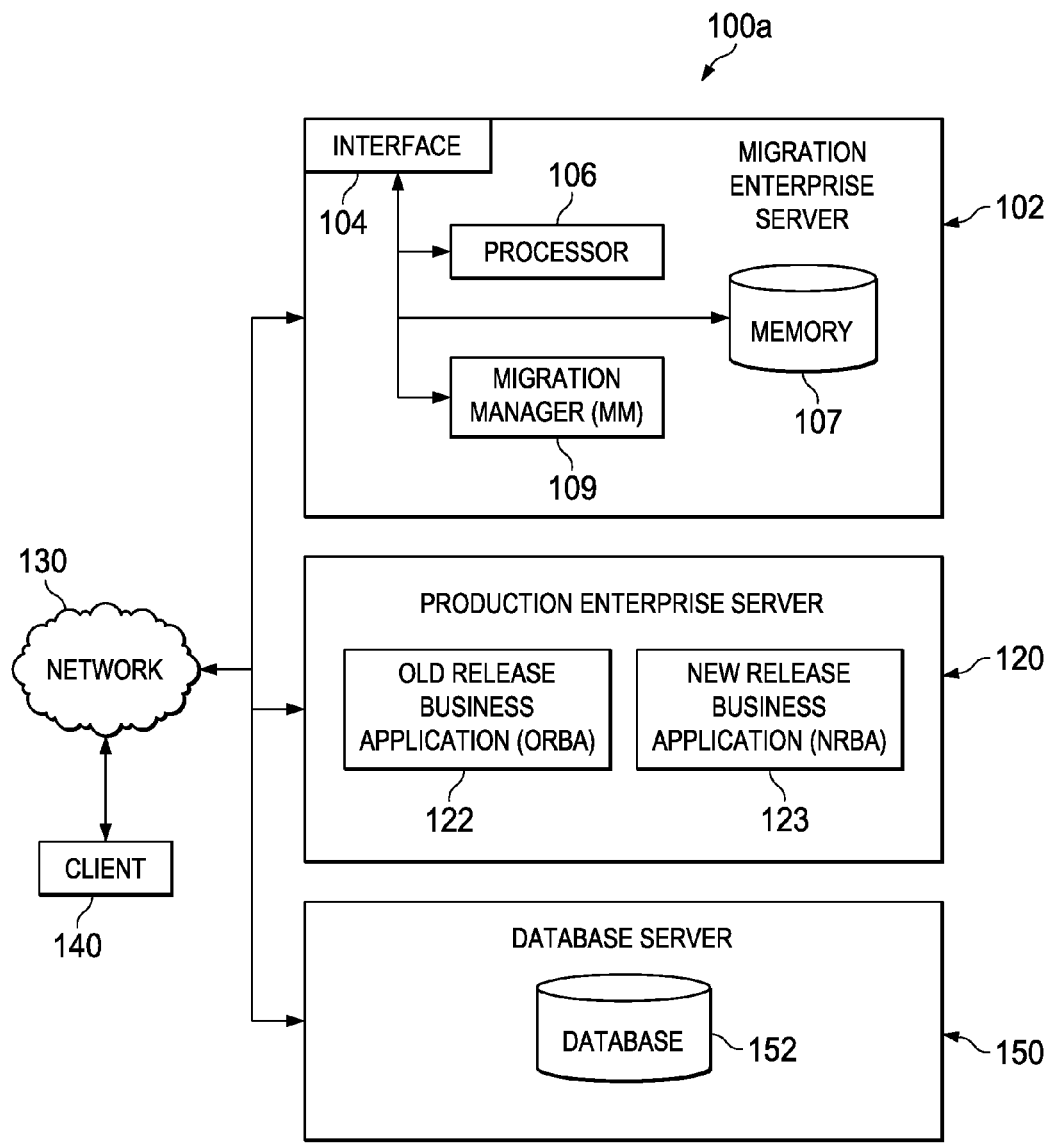
FIG. 1A is a block diagram illustrating an example system for migration of business object data.

FIG. 1A illustrates an example distributed computing system 100 for migration of business object (BO) data. At a high level, the illustrated example distributed computing system 100 includes or is communicably coupled with a migration enterprise server (MES) 102, a production enterprise server (PES) 120, a database server 150, and a client 140 that may communicate using, for example, a network 130 or other communication method. In some implementations, the MES 102, PES 120, and/or database server 150 can be limited as to which other component of the distributed computing system 100 communication is permitted. The MES 102, PES 120, and database server 150 may each comprise a computer operable to receive, transmit, process, store, or manage data and information associated with the example distributed computing system 100 or be implemented on a single computer or multiple computers in various combinations.

The MES 102 is an enterprise server executing at least a migration manager (MM) 109 (described below). At a high-level, the MES 102 is responsible for migrating ORBA 122-formatted BO data present in tables on the database server 150 into a new release business application (NRBA) format for use by a NRBA (described below). Requests to migrate BO data are typically part of a normal software upgrade process, for example, an overall software upgrade process when upgrading from the ORBA to the NRBA. In some implementations, requests to migrate data can also be received from the client 140, internal users, external or third-party customers, other automated applications, as well as any other appropriate entities, individuals, systems, or computers. The MES 102 responds to the received requests by processing the data migration requests in a MM 109 associated with the MES 102. The MM 109 migrates the ORBA 122-formatted BO data into the NRBA-formatted BO data. According to one implementation, MES 102 may also include or be communicably coupled with an e-mail server, a web server, a caching server, a streaming data server, and/or other suitable server. In other implementations, the MES 102 and related functionality may be provided in a cloud-computing environment.

The MES 102 includes an interface 104, a processor 106, and a memory 107. The interface 104 is used by the MES 102 for communicating with other systems in the example distributed computing system 100, for example the client 140. Although illustrated as a single interface 104 in FIG. 1, two or more interfaces 104 may be used according to particular needs, desires, or particular implementations of the example distributed computing system 100. Generally, the interface 104 comprises logic encoded in software and/or hardware in a suitable combination and operable to communicate with the network 130. More specifically, the interface 104 may comprise software supporting one or more communication protocols associated with communications such that the network 130 or the interface 104 hardware is operable to communicate physical signals within and outside of the illustrated example distributed computing system 100.

The processor 106 is generally used by the MES 102 to receive/respond to requests, execute instructions, and/or manipulate data to perform operations specific to the MES 102. Specifically, the processor 106 executes the functionality required to migrate BO data using the MM 109. Although illustrated as a single processor 106 in FIG. 1, two or more processors 106 may be used according to particular needs, desires, or particular implementations of the example distributed computing system 100.

The memory 107 holds at least objects and/or data required by the MES 102 to migrate BO data using the MM 109. In some implementations, memory 107 can act as a cache and/or storage location for source BO data associated with the ORBA 122 and/or migrated BO data associated with the NRBA. Although illustrated as a single memory 107 in FIG. 1, two or more memories 107 may be used according to particular needs, desires, or particular implementations of the example distributed computing system 100.

In some implementations, the MES 102 may include a plurality of various migration managers 109. In other implementations, the MES 102 may be a dedicated server meant to store and execute only a single MM 109. In still other implementations, the MES 102 can store and execute none, a single instance, and/or a plurality of migration managers 109. In some implementations, the MES 102 may comprise a web server, where the MM 109 represent one or more web-based applications accessed and executed by the client 140 using the network 130, directly at the MES 102, and/or other components of the example distributed computing system 100 to perform the programmed tasks or operations of the MM 109.

The MM 109 is a service or stand-alone application that migrates BO data from an older format supported by the ORBA 122 into a newer format usable by the NRBA. In some implementations, the MM 109 is triggered by the overall software upgrade process discussed above. In some implementations, the MM 109 automatically determines that a migration of BO data is required, while in others, the migration may be triggered by manual user actions.

Figure 1B:
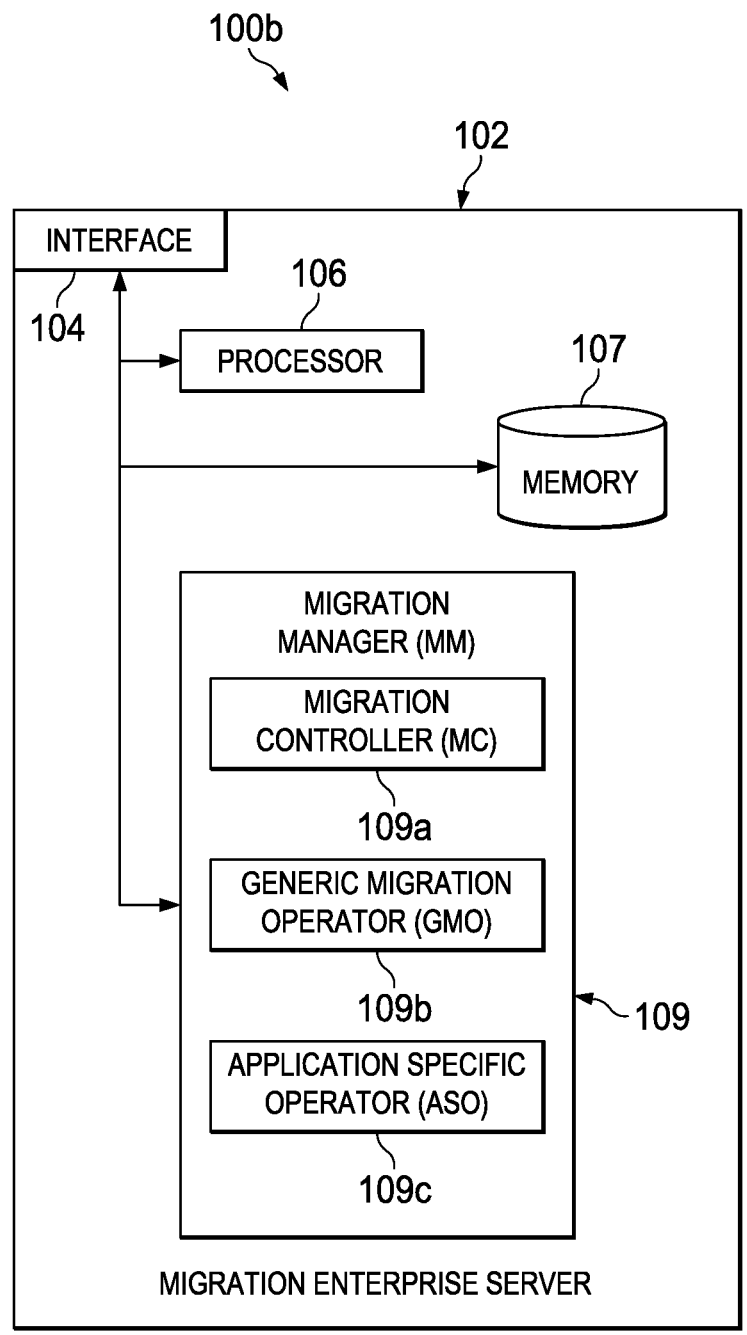
FIG. 1B is a block diagram illustrating components of a migration manager.

Turning now to FIG. 1B, FIG. 1B is a block diagram illustrating components of a MM 109. The MM 109 provides, among other things, overall control/management of the BO data migration process, handling of production BO data requests, confirmation of data migration success, and logging of data migration results. The migration manager (MM) 109 includes, collectively, a migration controller (MC) 109a, a generic migration operator (GMO) 109b, and application specific operator (ASO) 109c. The MM 109 is implemented in a mainly application independent/generic manner and is largely independent of application specific knowledge apart from necessary application specific migration knowledge and/or logic provided by the ASO 109c.

The MC 109a provides, as stated above, the overall control/management of the data migration process, including coordinating other components of the MM 109, and handles concurrent production transactions running on the ORBA 122 to provide a seamless or near-seamless handling of BO data transactions and BO data migration. The MC 109a does not delay any production transactions accessing the same BO data in parallel to a migration transaction of the MM 109. The MC 109a also ensures any BO data which has been accessed by a concurrent production transaction during migration will be migrated again in order to achieve final data consistency. The migration manager also confirms that BO data is successfully migrated and performs BO data migration process logging functions. Exception handling is also performed by the MC 109a. For example, the migration manager can manage migration process restarts in the case of migration process interruptions and/or process failures.

To migrate BO data, the GMO 109b uses a BO meta-model (described below) to transform BO data from an old BO model format to a new BO model format. During BO data migration, the GMO 109b updates a shadow database (described below) with the old BO data in the new BO model format. The GMO 109b provides knowledge and/or logic to migrate BO data.

The ASO 109c provides application specific migration knowledge and/or logic needed for migration that is not contained in the BO meta-model. For example, there may be entries in a dependent database table belonging to a particular BO instance. If the dependency is not fully described in the BO metamodel, the ASO 109c provides the logic to determine the identifier for the BO instance the entries belong to. In some instances, the ASO 109c can be provided to the MM 109 by the overall software upgrade process or a reference to the ASO 109c may be provided for the MM 109 to access and execute as needed. The ASO 109c generally requires little development and/or test effort to prepare for a migration process from an ORBA 122 to a NRBA In some implementations, the MC 109a, GMA 109b, and/or ASO 109c are implemented as ABAP class libraries or class libraries written in other suitable computer languages. The class libraries provide well-defined interfaces. The class libraries are imported by the overall upgrade process into a database, stored in specific shadow tables containing code for a new software code release. The MES 102/MM 109 accesses the new software release code directly from the database using specific aliases in the shadow database schema (explained in more detail below).

The ASO 109c is also capable of keeping track of BO references necessary to migrate, if necessary, that are associated with a particular BO. For example, the migration manager can migrate all BO instances associated with a particular set of BO root node IDs read from a dedicated root or header database table for the particular BO as BO instances and BO root node IDs are in a 1:1 correspondence. The GMO 109b may work in conjunction with the ASO 109c to provide various tasks. For example, during each migration of a BO instance, the identifier (root node ID) of the BO instance is stored for each database record belonging to the BO instance for all database tables of the old data model. This is needed to identify BO instances which need to be re-migrated in a later migration phase due to changes from ORBA 122 transactions. Further, BO instance identifiers may be different between the old and the new data models. For this reason, a mapping from the old to new BO identifiers must be kept because other BO instances which are migrated at a later point in time may have references for BO instances which are already migrated. These BO references must be adapted to the new identifiers during migration.

In addition, if a BO instance is changed, this does not necessarily mean that all database records associated with the BO instance are changed. For example, one value of a purchase order can be changed and as a result only one row in one dependent database table is updated while the purchase order BO's header entry in the root database table remains unchanged. From the database triggers, only the key of the changed row in the dependent database table is known and retrieved by the MC 109a. The GMO 109b and/or ASO 109c determines the BO root node ID that the row in the dependent database table belongs to.

Logic is also provided to determine the need for re-migration between database tables and corresponding shadow database tables. For example, the MC 109a can determine BO instances which need to be re-migrated in one or more later migration phases due to data changes by parallel operating business applications, for example the ORBA 122.

The ASO 109c may also define a minimal required BO specific logic which cannot be implemented centrally using corresponding interfaces. For example, given code values of "High," "Medium," and "Low" and that an order date shall be derived in the NRBA in a BO instance new field "Required Response Time" with the values "Very Fast," "Fast," and "Normal", the mapping between old and new BO instance fields could be modeled, but is typically just coded. For example, the code could resemble "if ((priority="High") and ((order_date+2 weeks)<=today)), then required_response_time="Fast."

Figure 2:
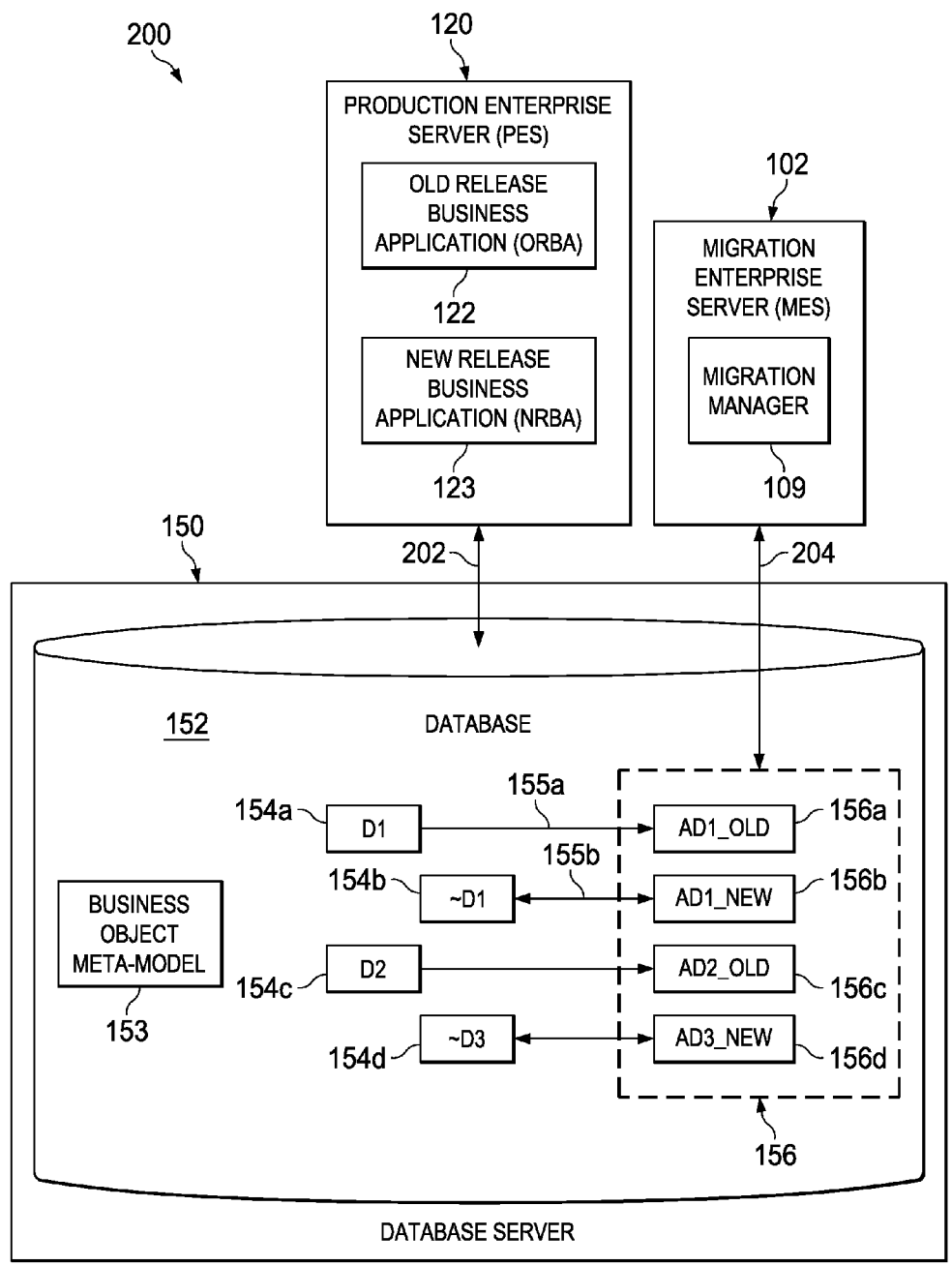
FIG. 2 is a block diagram illustrating components of a database associated with a database server and system interactions with the illustrated components.

Although illustrated in FIGS. 1 and 2 as a single MM 109, two or more MMs 109 may be used according to particular needs, desires, or particular implementations of example distributed computing system 100. For example, a MM 109 may execute on the MES 102 and either the PES 120 and/or the database server 150. The MM 109 can be any application, program, module, process, or other software that may provide methods and a graphical user interface to evaluate, transform, create, store, delete, and/or other suitable operation required to migrate BO data from a source format into a target format. In some implementations, a particular MM 109 can operate in response to and in connection with at least one request received from a client 140 application, an associated NRBA, and/or an ORBA 122. Additionally, a particular MM 109 may operate in response to and in connection with at least one request received from other NRBAs and/or MMs 109, including NRBAs and/or MMs 109 associated with another MES 102. In some implementations, each MM 109 can represent a web-based application accessed and executed by remote clients 140 using the network 130 (e.g., through the Internet, or using at least one cloud-based service associated with the MM 109). For example, a portion of a particular MM 109 may be a web service associated with a MM 109 that is remotely called, while another portion of the particular MM 109 may be an interface object or agent bundled for processing at a remote client 140. Moreover, any or all of a particular MM 109 may be a child or sub-module of another software module or enterprise application (not illustrated) without departing from the scope of this disclosure. Still further, portions of the particular MM 109 may be executed or accessed by a user working directly at the MES 102, as well as remotely at a corresponding client 140, PES 100, and/or database server 150.

Returning now to FIG. 1, the PES 120 is an enterprise server executing the above-mentioned ORBA 122 and NRBA 123 following migration of data from an older format supported by the ORBA 122 into a newer format usable by the NRBA 123. The NRBA 123 represents an updated version/software release of the ORBA 122 and may communicate with at least a database operating on the database server 150. The PES operates in a production environment in a productive role. For example, the ORBA 122 is in productive use by customers and must remain executing until the customers switch application usage to the NRBA 123 and/or cease use of the ORBA 122. In some implementations, the PES 120, ORBA 122, and/or associated ORBA 122 BO data on database server 150 can have a service level agreements (SLA) in place to ensure the continuous operation of the ORBA 122 and/or availability of the associated ORBA 122 BO data.

The PES 120 includes an interface, a processor, and a memory (not illustrated) each similar to the above-mentioned interface 104, processor 106, and memory 107, respectively, of the MES 102 and may each be used to perform functions specific to the PES 120. The interface may be used for communicating with other computing systems in the example distributed computing environment 100 using the network 130. The processor specifically executes instructions and manipulates data to perform the operations for the PES 120, including the functionality required to send/receive requests/responses to/from the MES 102, database server 150, and/or client 140. The memory stores objects and/or data necessary for the operation of the PES 120 and to interface with and/or manage the ORBA 122 and/or NRBA 123.

The client 140 may be any computing device operable to receive, transmit, process and/or store any appropriate data, connect to, and/or communicate with the MES 102 and/or PES 120 using the network 130. In some implementations, the client 140 can communicate with other components of the example distributed computing system 100. While the illustrated example distributed computing system 100 includes one client 140 communicably coupled to the network 130, alternative implementations of the example distributed computing system 100 may include any number of clients 140 suitable to the purposes of the example distributed computing system 100. The illustrated client 140 is intended to encompass any computing device such as a desktop computer, laptop/notebook computer, wireless data port, smart phone, personal data assistant (PDA), tablet computing device, one or more processors within these devices, or any other suitable processing device. For example, the client 140 may comprise a computer that includes an input device, such as a keypad, touch screen, or other device that can accept user information, and an output device, such as a graphical user interface (GUI) that conveys information associated with the operation of one or more components of the example distributed computing environment, including the client 140 itself. The GUI may provide an interface with the client 140 and/or one or more components of the example distributed computing system 100, for example the MES 102 and/or PES 120, and provide users with an efficient and user-friendly presentation of data provided by or communicated within the example distributed computing system 100.

The illustrated client 140 further includes one or more client applications (not illustrated). A particular client application may be any type of software application, for example a web browser, that allows the client 140 to request, view, and/or manage content on the client 140. In some implementations, the client-application can use content, parameters, metadata, and other information received from the MES 102 and/or the PES 120. Once a particular client application is launched, a user may interactively process a task, event, or other information associated with the MES 102 and/or the PES 120. Further, although illustrated as a single client application, the client application may be implemented as multiple client applications in the client 140.

The illustrated client 140 further includes an interface, a processor, and a memory (each not illustrated). The interface may be consistent with or different from the above-mentioned interface 104 of the MES 102 and may be used by the client 140 for communicating with other computing systems in the example distributed computing environment 100 using the network 130. The processor may be consistent with or different from the above-described processor 106 of the MES 102 and specifically executes instructions and manipulates data to perform the operations for the client 140, including the functionality required to send/receive requests/responses to/from the MES 102, PES 120 and/or other components of the example distributed computing system 100. The memory may be consistent with or different from one or more of the above-described memories of the MES 102 but storing objects and/or data associated with the purposes of the client 140.

The database server 150 contains at least one database 152. The database server 150 may include an interface, a processor, and a memory (not illustrated), each consistent with or different from the above-mentioned interface 104, processor 106, and memory 107, respectively, of the MES 102. Each of the interface, processor, and memory may be used by the database server 150 to perform functions specific to the database server 150. The interface may be used for communicating with other computing systems in the example distributed computing environment 100 using the network 130. The processor specifically executes instructions and manipulates data to perform the operations for the database server 150, including the functionality required to send/receive requests/responses to/from the MES 102, PES 120, and/or client 140. The memory stores objects and/or data necessary for the operation of the database server 150 and to interface with and/or manage the database 152.

The database 152 may be a conventional database and/or an in-memory database relying on non-volatile magnetic, optical, removable, or other suitable non-electronic memory (in the case of a conventional database) or volatile electronic memory (in the case of an in-memory database), for storage, retrieval, and processing of data. The database 152 includes one or more database tables including system data, BOs, BO data, and/or BO metadata. System data is metadata, for example describing a BO structure. Another example is software of both the ORBA and the NRBA residing on example database tables Dn and corresponding shadow database table ~Dn, respectively. BO data may be business data, for example sales order #487 for a customer MyPC, Inc. associated with the purchase of two computers. The database server 150 also includes aliases to refer to specific database tables in the database 152.

ABO can be considered a representation of an intelligible business/non-business entity, such as an account, an order, employee, customer, an invoice, a sales order, a financial report, etc. and may encompass both functions, for example in the form of methods, and BO data, such as one or more properties. For example, a function may include instantiate, delete, clear, etc. A property may include customer ID, date, time, shipping address, billing address, phone number, email address, primary contact, etc. BOs may reduce system complexity by reducing a system into smaller units. The implementation details of BOs are typically hidden from a non-development user and may be accessed through the defined functions and encapsulated data. BOs can contain both master data and/or transaction data. Master data is information that may be reused across multiple systems, application, and/or processes, such as data about customers, product, employees, materials, suppliers, etc. In contrast, transaction data is information that describes a particular business transaction, such as a sales order, invoice, payment, activity record, travel records, etc.

Turning now to FIG. 2, FIG. 2 is a block diagram illustrating components of a database 152 associated with a database server 150 and system interactions with the illustrated components. Interacting system components include the MES 102 and associated NRBA 123 and MM 109 and the PES 120 with associated ORBA 122.

Database 152 includes database tables 154a ("D1") and 154b ("~D1"). Here, database table ~D1 is "shadowing" old database table D1. For the purposes of this disclosure, "shadowing" an old database table means the use of another database table, a "shadow" database table, for example database table ~D1, that is written to and/or read from and contains the same BOs, BO data, etc. (hereinafter "BO data"), in whole or in part, as that contained on the old database table, for example database table D1. While the old database table D1 data format is compliant with the BO data format requirements of the ORBA 122, the shadow database table ~D1 data format is compliant with the BO data format requirements of the NRBA 123 for which the BO data is being migrated.

The shadow database table ~D1 and/or the database table D1 contains a history, for example a log table within database 152, in whole or in part, of modifications and/or operations performed on the each table related to the shadowing function. In some implementations, the use of a log table provides transactional consistency and the ability to recover in case of failures, for example a disk failure. In some implementations, the MM 109, logs all changes (inserts, updates, and/or deletes) at least on the old database tables into a specific logging table (not illustrated). In other implementations, the database 152 can perform the logging functions using database triggers created by the overall upgrade process. These changes result from user interactions with the old database tables due to the fact that the old database tables are in productive use. Not only are committed changes to the database logged, but also rolled back changes to the database. This is necessary because the migration manager could read and migrate temporarily changed "dirty" records which would need to be corrected at a later time in the data migration.

The database 152 also contains one or more database aliases 156 created by the overall upgrade process, for example database aliases 156a ("AD1_OLD") and 156b ("AD1_NEW"). A database alias is a referential data structure providing an alternate name that refers to a particular local database table, sequence, other database schema object in order to provide access to the particular database's database tables without having direct access to and/or having to make direct calls to the particular database. Aliases are also used to simplify access to database objects owned by other users. In some implementations, database aliases are stored within a system database directory or other suitable location. For example, database alias AD1_OLD refers to the database table D1 and database alias AD1_NEW refers to the shadow database table ~D1. In some implementations, different databases can be used can be used for the old BO data and for the newly formatted BO data. In other words, data may be copied and migrated from an old format on the source database to a new format on a target database.

Database aliases 156 are part of the database 152. In some implementations, database tables 154 and aliases 156 are located in different schemata of the same database. In some implementations, PES 120/ORBA 122 and MES 102/MM 109 connect as different DB users to different schemata of the database 152. For example, PES 120/ORBA 122 connects to a "production" database schema as a production database user. The production database schema is permanent and exists prior to the start of the overall upgrade process and will continue to exist after the overall upgrade process is completed. The production database schema contains at least all the database tables 154.

The MES 102/MM 109 can read and write database data, but is not able to access any APIs, such as local proxy APIs and remote function/method calls, web services, and the like, in the old system. In contrast, the ORBA 122 does not have these restrictions. To clarify, the MM 109 provides the created database aliases to all components of the MM 109 because the MES 102/MM 109 is restricted to accessing database tables by using database aliases. In some implementations, database aliases 156 are provided to the NRBA 109 using an API (not illustrated) provided by the MM 109. For example, as shown in the illustrated example, the PES 120/ORBA 122 is shown with a direct access connection 202 to the database 152 and associated database tables of its "production" schemata. In contrast, the MES 102/MM 109 is capable of only accessing database 152 database tables using a connection 204 through the one or more database aliases 156 in a different database 152 schema.

Shadow database tables are created for both read/write access to allow migration of BO data. For example, the MM 109 collectively may read from and/or write data to the shadow database table ~D1 using the database alias 156b ("AD1_NEW"). Connection 155b indicates a read/write connection. However, database alias AD1_OLD may be used to only read BO data to be migrated from database table D1. Connection 155a indicates a read-only connection. In some implementations, it is possible that an old database table, for example database table 154c ("D2") is replaced completely by shadow database table 154b ("~D3"). This may happen if a new BO structure is different enough from the original BO structure that reusing the same database table leads to unnecessary effort during the development phase of the new BO structure. In this case, database table D2 does not have an associated shadow database table and the shadow database table ~D3 does not have an associated old database table. Here, database alias 156c ("AD2_OLD") may be used for read-only access to database table D2 and database alias 156d ("AD3_NEW") may be used for read/write access to shadow database table ~D3. In still other implementations, an old database table, for example Dx, can be replaced by multiple new database tables, for example Dy1, Dy2, and Dy3. As will be appreciated by those skilled in the art, there are, without departing from the scope of this disclosure, various methods of using database aliases to refer to both the old database table and the multiple new database tables in accordance with particular needs, desires, or particular implementations of the example distributed computing system 100.

The database 152 also contains the BO meta-model (BOMM) 153. The BOMM 153 contains meta-data describing each BO, including data types, data structures, and analytical objects. For example, the BOMM 153 describes the structure and BO attributes of a sales order BO. The BOMM 153 is located in database tables of database 152 and is accessed by the MM 109 using aliases (not illustrated).

Figure 3:
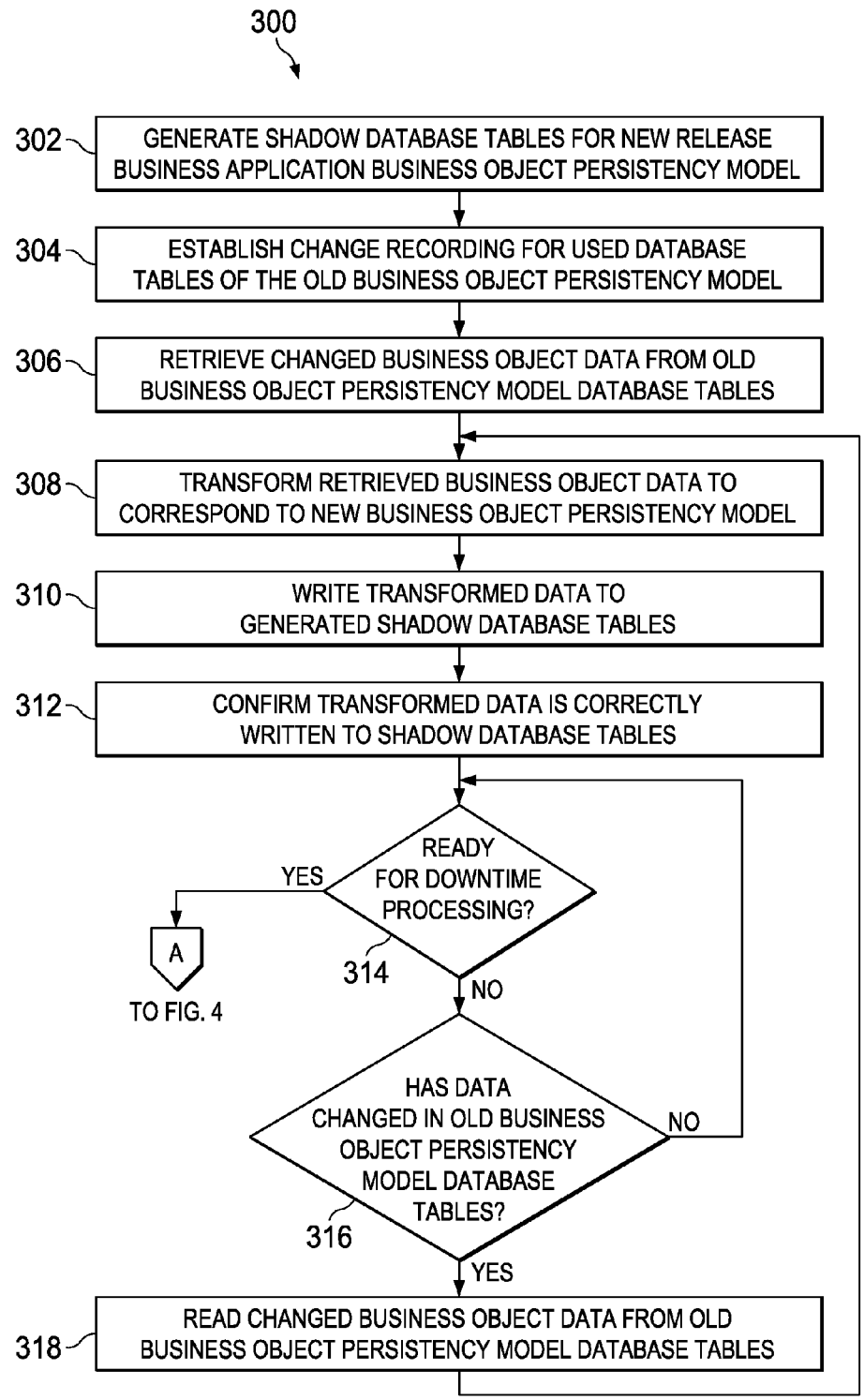
FIG. 3 is a flow chart for uptime business object data migration.

Turning now to FIG. 3, FIG. 3 is a flow chart 300 for uptime BO data migration. In some implementations, a majority of the BO data migration occurs during uptime execution of the ORBA. For clarity of presentation, the description that follows generally describes method 300 in the context of FIGS. 1A, 1B, and 2. However, it will be understood that method 300 may be performed, for example, by any other suitable system, environment, software, and hardware, or a combination of systems, environments, software, and hardware as appropriate.

At 302, a shadow database table is generated by the overall upgrade process for a NRBA BO persistency model. The shadow database table corresponds to a database table associated with an ORBA BO persistency model. For example, as shown in FIG. 2, shadow database table ~D1 is generated for the NRBA and corresponds to database table D1 associated with the ORBA. From 302, method 300 proceeds to 304.

At 304, change recording is established by the overall upgrade process through the generation of database triggers to indicate used database tables of the ORBA BO persistency model. For example, database table D1 shown in FIG. 2 would have change recording established to track any changes to database table D1 from a specific point in time. This is necessary to ensure proper uptime migration of BO data and, if necessary, subsequent downtime migration operations. From 304, method 300 proceeds to 306.

At 306, changed BO data is retrieved by the MC, GMO, and/or the ASO from the old BO persistency model database tables. User changes to BO data on either a root database table or dependent database tables are logged generically by the migration manager on a database level. This is possible because the BO meta-model describes BO dependencies and BO relationships to database tables. Each BO has a dedicated "root" database table containing the header entries of all instances of the BO. Given a particular root database table, database records are read by the MC package-wise from the root database table, rootNodeIDs (BO instance identifiers) are derived by the GMO and/or ASO from the read database records, and all data of the BO instances associated with the derived BO instance identifiers are read by the GMO and/or ASO from the root database table and all dependent tables containing data of the BO. A particular BO instance can be determined from changes indicated on a dependent database table. This determination allows the migration/remigration of the entire BO instance. From 306, method 300 proceeds to 308.

At 308, retrieved BO data in the old BO persistency model format is transformed by the GMO and/or the ASO to correspond to a new BO persistency model format. From 308, method 300 proceeds to 310.

At 310, transformed BO data is written by the GMO to created shadow database tables containing BOs and associated BO data corresponding to the new BO persistency model. In some implementations, the transformed BO data is written to the shadow database tables using database aliases. From 310, method 300 proceeds to 312.

At 312, the transformed BO data is confirmed as being correctly written to the shadow database tables. In some implementations, the MC logs the confirmation. Note that 306-312 are processed package-wise, and if the number of records to be processed exceeds the package size, the processing may be executed in a loop during uptime until the MC determines that the uptime BO data migration is complete. From 312, method 300 proceeds to 314.

At 314, a determination is made whether downtime processing is appropriate. Typically, downtime would be scheduled by administrators in charge of the overall upgrade process. In some implementations, downtime can be determined automatically, for example by the MM at a pre-determined time, according to a data milestone, flag, and/or other suitable indicator. If at 314, it is determined that downtime processing is appropriate, method 300 proceeds to FIG. 4 for downtime processing. If at 314, however, it is determined that downtime processing is not appropriate, method 300 proceeds to 316.

At 316, a determination is made by the MC as to whether BO data has changed in the old BO persistency model database tables. If at 316, it is determined that BO data has not changed in the old BO persistency model database tables, method 300 proceeds to 314. If at 316, however, it is determined that BO data has changed in the old BO persistency model database tables, method 300 proceeds to 318.

At 318, the changed BO data from the old BO persistency model database tables is read by the MC, GMO, and/or ASO. Here the MC determines changed records in any database tables containing BO data. If the GMO and/or ASO have not provided BO instance identifiers at a previous migration step, they are provided here. The GMO and/or ASO then read complete BO instance data for the determined BO instance identifiers. From 318, method 300 proceeds to 308.

Figure 4:
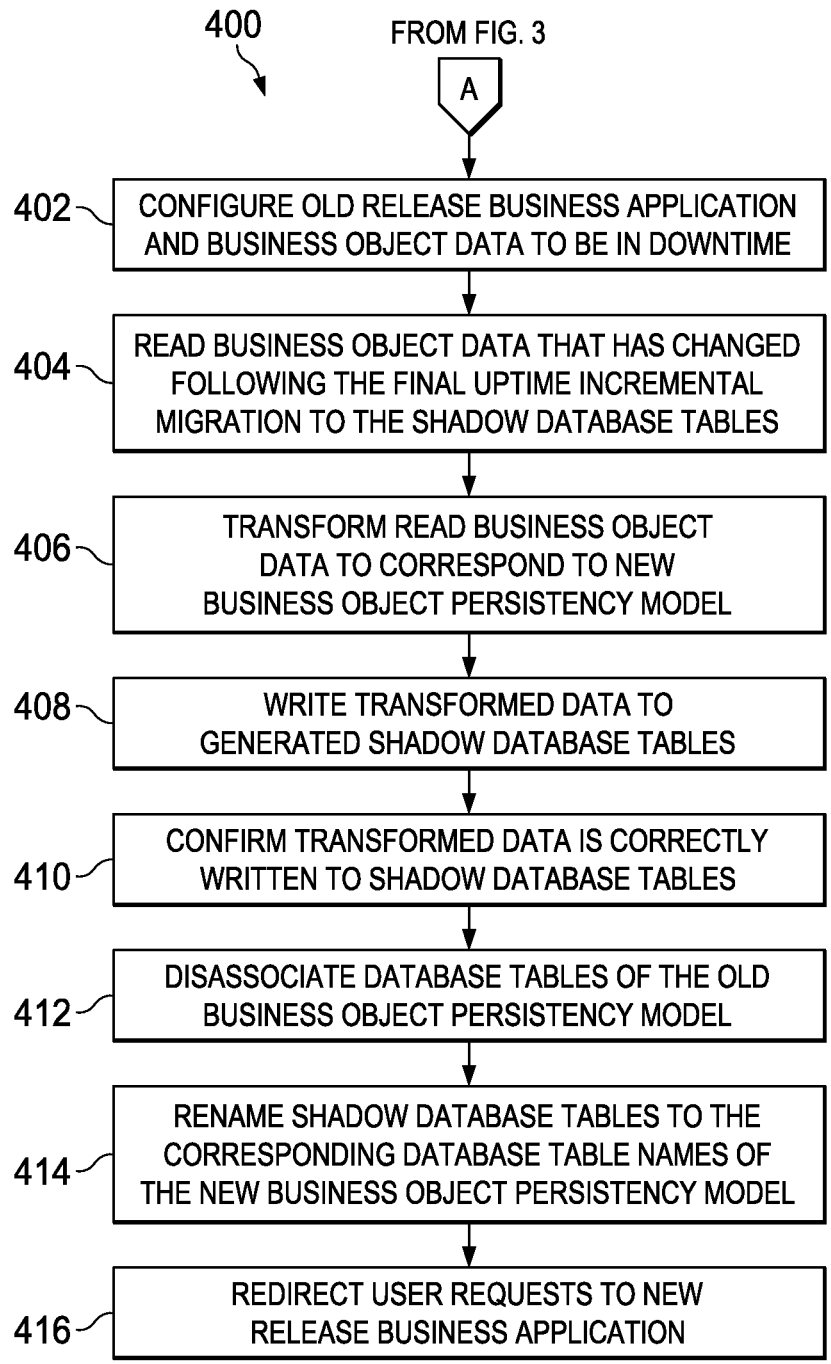
FIG. 4 is a flow chart for downtime business objection data migration.

Turning now to FIG. 4, FIG. 4 is a flow chart 400 for downtime BO data migration. In some implementations, a minority of the BO data migration occurs during downtime of the ORBA and/or NRBA. Migration of BO data during downtime can generally be called a delta migration, or in other words, BO data modified following an initial migration(s) during uptime. Generally, in downtime, the delta migration of BO data is relatively smaller than BO data migration during uptime processing. For clarity of presentation, the description that follows generally describes method 400 in the context of FIGS. 1A, 1B, 2, and 3. However, it will be understood that method 400 may be performed, for example, by any other suitable system, environment, software, and hardware, or a combination of systems, environments, software, and hardware as appropriate.

At 402, the ORBA and associated BO data is configured to be in "downtime" by the overall upgrade process. In other words the ORBA is shut down from a productive standpoint and cannot be used by users. From 402, method 400 proceeds to 404.

At 404, changed BO data is retrieved where the BO data has changed following the last uptime incremental migration to the shadow database tables. The changed BO data from the old BO persistency model database tables is read by the MC, GMO, and/or ASO. Here the MC determines changed records in any database tables containing BO data. If the GMO and/or ASO have not provided BO instance identifiers at a previous migration step, they are provided here. The GMO and/or ASO then read complete BO instance data for the determined BO instance identifiers. From 404, method 400 proceeds to 406.

At 406, retrieved BO data in the old BO persistency model format is transformed by the GMO and/or the ASO to correspond to a new BO persistency model format. From 406, method 400 proceeds to 408.

At 408, the transformed BO data is written by the GMO to the shadow database tables created during uptime BO data migration. From 408, method 400 proceeds to 410.

At 410, transformed BO data is logged by the MC as being correctly written to the created shadow database tables. Note that 404-410 are processed package-wise, and if the number of records to be processed exceeds the package size, the processing may be executed in a loop until the migration manager determines that all appropriate database records have been retrieved. From 410, method 400 proceeds to 412.

At 412, database tables of the old BO persistency model are disassociated by the overall upgrade process from access by the ORBA. In some implementations, disassociation includes renaming, deletion of the table and/or contents, deletion/ redirection/renaming of any alias referring to the old database table, encryption, physical removal, or other suitable actions to prevent access to the old database table. From 412, method 400 proceeds to 414.

At 414, shadow database tables are renamed by the overall upgrade process to the corresponding database table names of the new BO persistency model to permit access by the NRBA using standard sequential query language (SQL) statements. From 414, method 400 proceeds to 416.

At 416, the NRBA is started on the PES and accesses the migrated BO data on the renamed shadow tables. Users are then permitted to log into the system and all user requests are directed to the NRBA which accesses the renamed shadow tables. After 416, method 400 stops.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program include, by way of example, can be based on general or special purpose microprocessors or both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method, comprising:
   during uptime processing:
   generating at least one shadow database table corresponding to a new business object (BO) persistency model;
   establishing change recording for at least one database table associated with an old BO persistency model, wherein a BO meta-model describes BO dependencies and BO relationships to the at least one database table and wherein each BO has a dedicated root database table containing header entries of all instances of the BO and database tables containing BO data associated with the BO that are dependent on the dedicated root database table, allowing user changes to the BO data on either the dedicated root database table or the dependent database tables being logged generically on a database level;
   retrieving, as changed data and using at least one computer, changed BO data from the at least one database table;
   transforming, as transformed data, the changed data to correspond to the new BO persistency model;

writing the transformed data to the generated at least one shadow database table; and retrieving, as further changed data during a final uptime retrieval of the BO data, BO data from the at least one database table upon a determination that the BO data has changed in the at least one database table after a prior retrieval of the BO data from the at least one database table.

2. The method of claim 1, wherein change recording logs changes to both the dedicated root database table and the dependent database tables.

3. The method of claim 1, wherein retrieving the changed data from the at least one database table includes:

deriving BO instance identifiers from database records read from the dedicated root database table; and reading data from each BO instance associated with the derived BO instance identifiers from the dedicated root database table for the BO instance and dependent database tables containing BO data associated with the BO instance.

4. The method of claim 3, wherein a particular BO instance is determined following a change to a row in a dependent database table following a change to the particular BO instance's data where a BO header entry for the particular BO instance in the dedicated root database table remains unchanged.

5. The method of claim 1, further comprising confirming the transformed data is correctly written to the at least one shadow database table.

6. The method of claim 1, further comprising:

based upon a determination that a downtime processing is appropriate:

retrieving, as final changed data, BO data from the at least one database table that has changed in the at least one database table after the final uptime retrieval of the BO data from the at least one database table;

transforming, as final transformed data, the final changed data to correspond to the new BO persistency model; and writing the final transformed data to the generated at least one shadow database table.

7. A non-transitory, computer-readable medium storing computer-readable instructions executable by a data processing apparatus to:

during uptime processing:

generate at least one shadow database table corresponding to a new business object (BO) persistency model;

establish change recording for at least one database table associated with an old BO persistency model, wherein a BO meta-model describes BO dependencies and BO relationships to the at least one database table and wherein each BO has a dedicated root database table containing header entries of all instances of the BO and database tables containing BO data associated with the BO that are dependent on the dedicated root database table, allowing user changes to the BO data on either the dedicated root database table or the dependent database tables being logged generically on a database level;

retrieve, as changed data, using at least one computer, changed BO data from the at least one database table;

transform, as transformed data, the changed data to correspond to the new BO persistency model;

write the transformed data to the generated at least one shadow database table; and retrieve, as further changed data during a final uptime retrieval of the BO data, BO data from the at least one database table upon a determination that the BO data has changed in the at least one database table after a prior retrieval of the BO data from the at least one database table.

8. The medium of claim 7, wherein change recording logs changes to both the dedicated root database table and the dependent database tables.

9. The medium of claim 7, wherein retrieving the changed data from the at least one database table includes:

deriving BO instance identifiers from database records read from the dedicated root database table; and reading data from each BO instance associated with the derived BO instance identifiers from the dedicated root database table for the BO instance and dependent database tables containing BO data associated with the BO instance.

10. The medium of claim 9, wherein a particular BO instance is determined following a change to a row in a dependent database table following a change to the particular BO instance's data where a BO header entry for the particular BO instance in the dedicated root database table remains unchanged.

11. The medium of claim 7, further comprising instructions to confirm the transformed data is correctly written to the at least one shadow database table.

12. The medium of claim 7, further comprising instructions to:

based upon a determination that a downtime processing is appropriate:

retrieve, as final changed data, BO data from the at least one database table that has changed in the at least one database table after the final uptime retrieval of the BO data from the at least one database table;

transform, as final transformed data, the final changed data to correspond to the new BO persistency model; and write the final transformed data to the generated at least one shadow database table.

13. A system, comprising:

at least one data processing apparatus configured, during uptime processing, to:

generate at least one shadow database table corresponding to a new business object (BO) persistency model;

establish change recording for at least one database table associated with an old BO persistency model, wherein a BO meta-model describes BO dependencies and BO relationships to the at least one database table and wherein each BO has a dedicated root database table containing header entries of all instances of the BO and database tables containing BO data associated with the BO that are dependent on the dedicated root database table, allowing user changes to the BO data on either the dedicated root database table or the dependent database tables being logged generically on a database level;

retrieve, as changed data, using at least one computer, changed BO data from the at least one database table;

transform, as transformed data, the changed data to correspond to the new BO persistency model;

write the transformed data to the generated at least one shadow database table; and retrieve, as further changed data during a final uptime retrieval of the BO data, BO data from the at least one database table upon a determination that the BO data has changed in the at least one database table after a prior retrieval of the BO data from the at least one database table.

14. The system of claim 13, wherein change recording logs changes to both the dedicated root database table and the dependent database tables.

15. The system of claim 13, wherein retrieving the changed data from the at least one database table includes:

deriving BO instance identifiers from database records read from the dedicated root database table; and reading data from each BO instance associated with the derived BO instance identifiers from the dedicated root database table for the BO instance and dependent database tables containing BO data associated with the BO instance.

16. The system of claim 15, wherein a particular BO instance is determined following a change to a row in a dependent database table following a change to the particular BO instance's data where a BO header entry for the particular BO instance in the dedicated root database table remains unchanged.

17. The system of claim 13, further configured to confirm the transformed data is correctly written to the at least one shadow database table.

18. The system of claim 13, further configured to:
based upon a determination that a downtime processing is appropriate:
retrieve, as final changed data, BO data from the at least one database table that has changed in the at least one database table after the final uptime retrieval of the BO data from the at least one database table;
transform, as final transformed data, the final changed data to correspond to the new BO persistency model; and
write the final transformed data to the generated at least one shadow database table.

* * * * *